Figure 1:
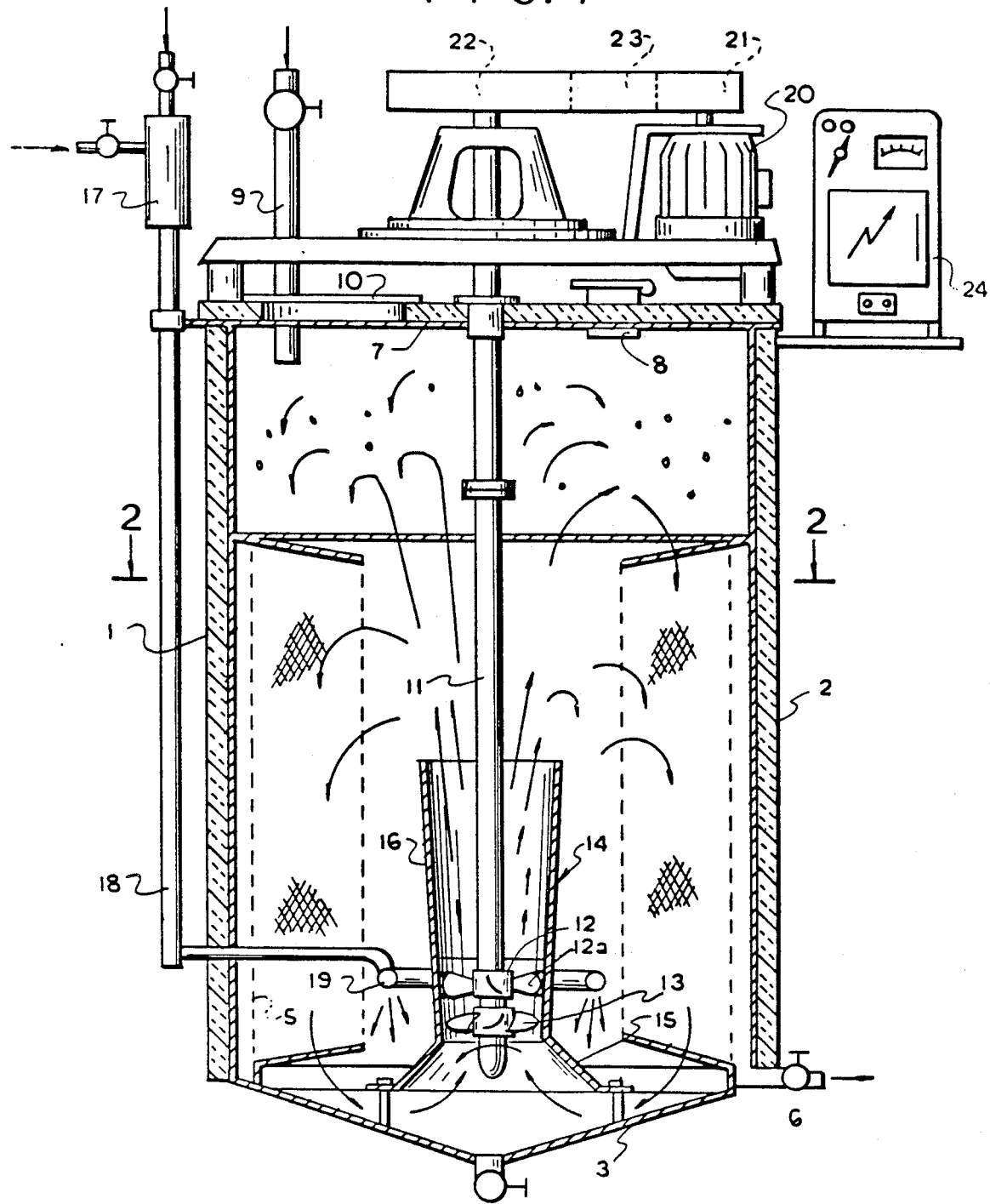

United States Patent [19]

Marev et al.

[11] Patent Number: 4,490,335
[45] Date of Patent: Dec. 25, 1984

[54] APPARATUS FOR THE EXTRACTION OF WATER SOLUBLE SUBSTANCES FROM FRUIT AND VEGETABLE PRESSINGS AND VEGETABLE RAW MATERIALS

[75] Inventors: Kiril S. Marev; Hristo G. Krachanov; Anton A. Bratanov; Nikolay A. Kirchev, all of Plovdiv, Bulgaria

[73] Assignee: Vi po Hranitelna I Vkussova Promishlenost, Plovdiv, Bulgaria

[21] Appl. No.: 403,871

[22] Filed: Jul. 30, 1982

Related U.S. Application Data

[62] Division of Ser. No. 178,577, Aug. 15, 1980, Pat. No. 4,370,473.

[30] Foreign Application Priority Data

Aug. 16, 1979 [BG] Bulgaria ................................ 46895

[51] Int. Cl.³ ...................... A23N 1/00; B01D 11/02; B01F 7/22
[52] U.S. Cl. ..................................... 422/269; 99/495; 422/227; 422/228; 422/276; 426/425; 426/429; 426/430; 426/431
[58] Field of Search ............... 422/227, 228, 271, 269, 422/276; 99/495; 426/425, 429, 430, 431; 536/2

[56] References Cited

U.S. PATENT DOCUMENTS

| | | | |
|---|---|---|---|
| 1,404,709 | 1/1922 | Allbright | 422/227 X |
| 1,565,282 | 12/1925 | Mabee | 99/495 X |
| 2,134,571 | 10/1938 | Morlock | 422/227 |
| 2,215,944 | 9/1940 | Vincent | 426/431 |
| 2,772,975 | 12/1956 | Rickers | 426/600 |
| 2,857,907 | 10/1958 | Kaether et al. | 99/495 X |
| 3,851,087 | 11/1974 | Nowlin | 426/425 |
| 4,258,007 | 3/1981 | Gragg et al. | 422/227 X |

FOREIGN PATENT DOCUMENTS

| | | | |
|---|---|---|---|
| 651085 | 10/1937 | Fed. Rep. of Germany | 422/269 |
| 651861 | 4/1951 | United Kingdom | 99/495 |

OTHER PUBLICATIONS

Food Engineering; Nov. 1952; pp. 87–89, 160–162, 134–137.

Primary Examiner—Barry S. Richman
Assistant Examiner—Brion P. Heaney

[57] ABSTRACT

Apparatus for the extraction of fruit and vegetable pressings and plant raw materials in a closed system. The extraction is effected by simultaneous mechanical and hydrodynamic effects on the materials, the fruit or plant mass being subjected to several extractions in two cyclically alternating modes of fountain-type and turbulent agitation with different intensities with bladed agitator tip speeds in an over-all range of 3 to 25 m/sec. The apparatus has a closed heat-insulated vessel with internal draining wall, a conical bottom, a cover having a ventilation opening, and an opening for the raw material, with a driving unit mounted on the cover with two driving speeds. The driving unit is a shaft on the lower end of which there is mounted an impeller, the shaft resting on a special bearing supported on a grid of blades rectifying the material flow, an elongated diffuser surrounding the impeller, the impeller together with a suction unit leading to the diffuser being fixed to the bottom of the vessel.

5 Claims, 2 Drawing Figures

APPARATUS FOR THE EXTRACTION OF WATER SOLUBLE SUBSTANCES FROM FRUIT AND VEGETABLE PRESSINGS AND VEGETABLE RAW MATERIALS

This is a division of application Ser. No. 178,577, filed Aug. 15, 1980, now U.S. Pat. No. 4,370,473.

There are well known methods of extracting pectin substances from dried applie pressings or citrus rinds. According to one method (Karakolev G., I. Ognyanov, M. Marinov. Pektinovi Veshtestva. Nauka i Izkustvo, Sofia (1956).), the extraction vessel is charged with apple pressings which are single or double washed by water with a slow agitation of the mixture. After a one hour draining of the wash water with the mixture at rest, hot water and a suitable amount of mineral acid (sulphurous, hydrochloric, sulphuric, or nitrous acid) is added for carrying out the extraction accompanied by a slow agitation of the mixture for a specified time. Then the extract is drained gravitationally, the mixture again being at rest. Hot water for a secondary extraction is added to the residue. After an agitation of 30 minutes, the second extract is drained off. Cold water is added to the residue for a third extraction. There then follows a draining of the third extract and a further pressing of the residue. The single or double washing of the raw material is omitted when pre-washed apple pressings or citrus rind pressings are being extracted.

The above cited article by Karakolev et al also discloses an apparatus for carrying out the method disclosed therein. Such apparatus includes a wooden vessel covered by a lid which has an opening for feeding the raw material thereinto. On such lid there is a driving unit which includes an electrical motor with a screw reducer for driving a vertical frame agitator. The agitator is submerged in the vessel liquor in a suspended position. The frame has several radial blades for increasing zones of agitation of the material in the vessel. The vessel has a second inner wall or double bottom of perforated acid-resistant terracotta tiles used for gravitational draining.

The main deficiencies of the above described prior method and apparatus are, in the first instance, the low diffusion speed of the pectin substances from the vegetable tissue to the solvent. For this reason the extraction process is lengthy (from 8 to 14 hours) and the degree of recovery of the pectin is rather low (50 to 70%). The above described apparatus fails to insure the intensive and even homogenization of the mixture in all zones of the extractor, and furthermore considerable power is needed to rotate the whole mass of the mixture in the extractor.

In another prior method (Kerteza, Z. I. The Pectic Substances. Interscience Publishers, New York (1951).) the raw material is subjected to acid pre-treatment by hydrogen chloride or any other acid agent to bring the pectin to a soluble form, following which the whole extraction process takes place. In this manner the subsequent proces of diffusion is improved, but nevertheless no complete pectin extraction can be achieved. The raising of the temperature of extraction improves the degree of extraction on the one hand, but on the other it reduces the jelly formation of the pectin due to resulting degradation processes.

Organic substance extraction from natural raw materials imposes specific requirements for a short process in order to eliminate any possibility for concurrent undesired side chemical, physicochemical and microbiological processes. Experiments for accelerating the extraction by ultrasound effects have not yet resulted in any industrial applications in the field of pectin production, due to poor technological results and the low efficiency of the ultrasound generators employed. Another manner of speeding up the process is to employ continuous extraction in the counterflow. This method is disclosed in (Owens, H. S., R. M. McCready and W. P. McLay. Food Technol., 3, 77 (1949).), and also in (Graham, R. P., A. D. Shepherd, Agricultural and Food Chemistry, 1, 16, 993 (1953).). No satisfactory results have been attained expecially in pectin production by means of counterflow extraction, mainly because of technological difficulties in the manner of extraction, extract separation, and the safety of the apparatus.

A method and apparatus for the intensification of extraction from vegetable raw material has been suggested in K. Marev, H. Krachanov, A. Bratanov, N. Kirchev-authors' certificate No. 24725, People's Republic of Bulgaria. This publication suggests such extraction by means of periodic short-term turbulent agitation of the extracting agent and the mass of vegetable matter by a propelling mechanism which guarantees relatively high speed of movement of the mass (ranging from 5 to 20 m/sec), and the transition of the mass from low pressure to high pressure zones, thus sharply accelerating the rate of the diffusion of the extracted substance. This method has been used with some success for the extraction of some vegetable raw materials (such as coffee, soybeans, herbs, etc) but certain faults in the extraction of pectin, mainly in the apparatus, limit the employment of theoretically more beneficial technological conditions in its operation. If the process is conducted in an ordinary cylindrical vessel of no special shape with a flat bottom, in the case of a lighter mode of agitation of the mass this is accompanied by the formation of some insufficiently active zones of the extracting volume, thereby prolonging the process and reducing the efficiency of the method. When a more intensive agitation is employed, considerable crushing of the mass is produced, in becomes sticky and cannot drain easily. This also reduces the efficiency of the whole process.

There are also well known methods of washing fruit and vegetable pressings after the separation of the natural fruit or vegetable juice for increasing the juice yield, as well as an apparatus for carrying out such method, which are characterized by lamellar extracting agent flow-around the extractable particles. Such method and apparatus are disclosed in Boney M. Tehonologiya na konserviraneto na plodovi i zelenchukovi sokove i knotsentrati. plovdiv (1978). The defect of these methods and apparatus is that diffusion is greatly delayed, as a result of which there is an insufficiently complete extraction of the extractable substance.

The present invention has among its objects the provision of a method and an apparatus for the periodic extraction of extractable substances from fruit and vegetable pressings and raw materials of vegetable origin which guarantee the accelerated and complete diffusion of the water soluble substances of the plant tissue to the extracting material by means of suitable physical and chemical effects, and the efficient extract separation by repeated raw material extraction.

In the method of the invention for the accelerated extraction of pectin and other extractable matter from plant material, the process is carried out with continuous agitation of the entire volume of the mass in two modes which differ in agitation intensity. In a preferred embodiment of the apparatus for carrying out such method the change of mode of agitation is effected in cycles by an automatic machine with a programmed effect, such machine having a two-speed electric motor which drives a bladed propeller mechanism to produce a fountain-type turbulent agitation at relatively high propeller tip speeds in an overall range of from 3 to 25 m/sec wherein the whole volume of the mass progresses repeatedly through zones of different pressures and speeds. After such agitation the extract is drained, and the mass is again extracted until the complete extraction of the extractable matter has been carried out. This permits the second extract to be used in a subsequent first extraction, the third extract to be used for a subsequent second extraction etc., whereby there is produced an extract of higher dry substance concentration.

Figure 2:
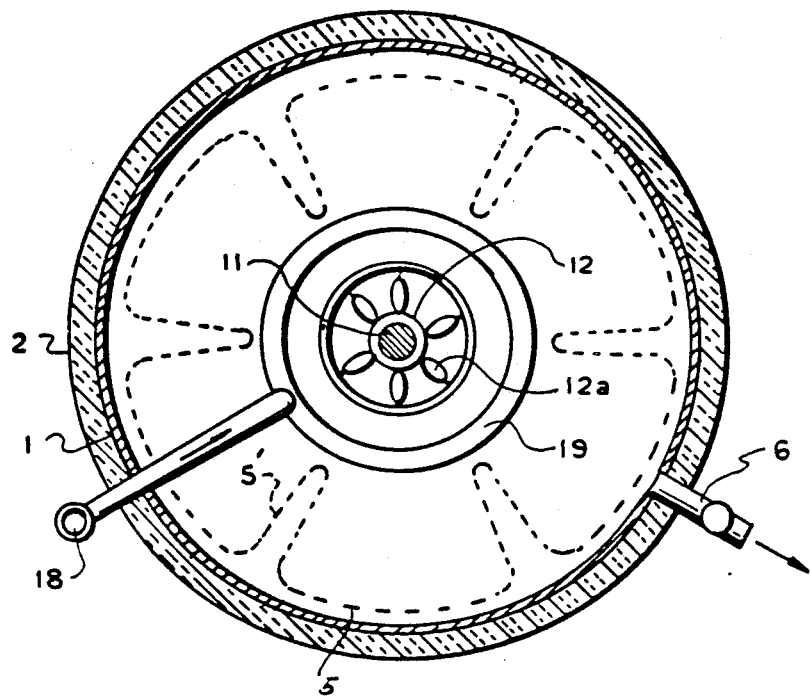

The invention will be more readily understood upon consideration of the accompanying drawings, in which:

FIG. 1 is a view in vertical section through a preferred embodiment of the apparatus of the invention, certain of the parts being shown in elevation, and FIG. 2 is a view in horizontal section through the apparatus of FIG. 1, the section being taken along the line 2—2 in FIG. 1.

The apparatus shown in FIGS. 1 and 2 has a circular cylindrical vessel 1 the side walls of which are provided with a layer of heat insulation 2. The bottom of vessel 1 is frusto-conical in shape, the lower central part of which is connected to an outlet for the discharge of solid material from the vessel. An upright screen 5 is disposed within the lower and intermediate parts of the vessel 1, the screen having arcuate portions spaced radially from the inner side wall of the vessel, such arcuate portions being of equal angular extent and being separated by inwardly folded zones 5' of the screen. Outwardly of the screen 5 the vessel is provided with a side outlet 6 at the bottom thereof for the periodic discharge of liquid extract.

Vessel 1 is provided with an upper cover or lid 7 having a closable inlet 8 for solid raw material to be introduced into the vessel. Cover 7 also has an inlet 9 with a shut-off valve therein to provide for the inlet of liquid into the vessel. A manhole cover 10 is provided so that access may be had when needed to the interior of the vessel 1.

A vertical shaft 11 is journalled in a suitable bearing in the cover 7, shaft 11 extending downwardly to a lower end disposed somewhat above the lowest central portion of the bottom 3 of the vessel. Affixed to the shaft 11 near the bottom end thereof in an impeller or propeller 13. Surrounding the impeller 13 is a diffuser, generally designated 14, the diffuser having a sharply upwardly converging frusto-conical lower portion 15, a circular cylindrical intermediate portion in the zone thereof immediately surrounding the impeller 13, and a gradually expanding frusto-conical upper portion 16 above 13. Immediately above the impeller 13 there is a bearing 12 for the lower end of shaft 11, the bearing 12 being mounted on the diffuser 14 through the medium of a mass flow rectifying grid composed of a plurality of generally radially extending blades 12a the tips of which are attached to the inner side wall of the diffuser at the circular cylindrical intermediate portion thereof. The blades of the impeller 13 and of the mass flow rectifying grid have opposite inclinations, as shown, whereby the mass issues from the upper end of diffuser 14 with little if any spin.

An injector-mixer 17, which is of the venturi pipe type, has a discharge pipe 18 leading downwardly therefrom and connected by a radially inwardly directed pipe extending through the wall of the vessel 1 to a central injector ring 19 having spray jet creating openings in the lower surface thereof, such openings being distributed around the circumferential extent of the ring 19.

The shaft 11 bearing the impeller 13 is driven by an electric motor 20 through a first pulley 21 disposed on the drive shaft of the motor, a second pulley 22 affixed to the upper end of the shaft 14, and a belt 23 driving the connecting pulleys 21 and 22. The electric motor 20 is under the control of control means mounted in a cabinet 24, as shown.

The above-described apparatus operates as follows.

The closed vessel 1 is filled with water or other liquid solvents through pipe 9 and with raw material through opening 8. At the same time, the shaft 11 is set rotation by energizing the motor 20 through the control means 24. The driven shaft 11 turns the impeller 13 as a result of which the fluid mass is sucked via the conical part 3 of the vessel 1 through portion 15 of the diffuser from which it flows past the impeller 13. In its flow upwardly, the mass is forced past the stationary blades 12a which rectify its flow; the mass then continuing through the upper part 16 of the diffuser and eventually reaches the upper surface of the mass within the vessel 1. The turbulent mass is spread outwardly from the center and sinks by being continuously pushed by new portions of the mass reaching the bottom part of the vessel, from which it is again sucked and so on. A complex fountain-type turbulent movement of the mass in both vertical and radial directions occurs in all zones within the vessel 1. The high speeds and the relatively large discharge of the stirring unit insure a rapid diffusion and rapid homogenization of the extraction fluid during this movement.

Steam for the continuous reheating, and other chemical reagents are introduced by the injector-mixer 17 as required, such introduction being effected through the pipe 18, the pipe ring 19, and the jet forming holes in such ring. The agitating unit is stopped by switching off the electric motor 20 either automatically or manually. The change of the operation modes from low to maximum speed of rotation of the shaft 11 and vice versa is effected automatically based upon a program, or manually if desired. The propeller blade tip speed in the light or slow speed agitation mode is from 3 to 10 m/sec, whereas in the heavy or intense mode of agitation the propeller blade tip speed ranges from somewhat above 10 to 25 m/sec.

The separation of the extract through outlet 6 can be done both when the motor 20 is idle or when it is rotating with a reduced speed. When the outlet opening 6 is opened the mass begins to be drained, the liquid extract being filtered through the walls of the screen 5,5', the portions 5' of the screen assisting in the draining of the raw material. After repeating the above described extraction process several times the raw material is released from the vessel 1 through the outlet opening 4 therein by opening the valve interposed in such opening.

The method of the invention is illustrated by the following non-limiting examples.

EXAMPLE 1

8 tons of cold water was put into the extraction vessel 1, the agitating mechanism was started by energizing motor 20, and 500 kg of dry apple pressings were introduced into the vessel 1 through the charging opening 8. After two minutes of agitation the motor 20 was stopped and the liquid phase was released by means of opening the valve in the outlet 6. A second batch of water warmed to 35° C. was then added for the complete washing of the water soluble matter which was drained in the same manner after a one minute period of agitation. Then 6.5 tons of hot (80°–90° C.) aqueous sulphurous acid solution was added with the simultaneous starting of the agitation mechanism. Such agitation mechanism was programmed for the following automatic operation: 10 min. of light agitation, 1 min. of intensive agitation, again 10 min. of light agitation and so on for a total of 30 minutes. During this time, the mass of material within the vessel 1 was held between 75° and 85° C., and the pH of such mass was held at pH=2.0. Corrections of the temperature and pH values were effected by means of the injector equipment 17. After the 30 minute period was over, the agitating mechanism was stopped and the extract (65–75% of the liquid phase) was drained. Again 6.5 tons of acid extracting agent was added, and the extraction was executed again in the manner described above. After the draining of the second extraction, the vegetable matter was removed from the vessel 1 by opening the outlet 4 and was delivered for pressing.

EXAMPLE 2

The apple pressings were washed in water in the manner described above in Example 1. The difference in the extracting process from that of Example 1 was in the fact that the first extraction instead of being made in fresh acid extracting agent was effected by hot extract from the second extraction, and the second extraction was effected by hot extract from the third one.

EXAMPLE 3

3 m$^3$ of cold water water was introduced into the vessel 1, the agitator was started, and 500 kg of apple pressings were introduced into the vessel through opening 8. After 1 min. of agitation and 15 min. of rest, the liquid phase (6.5 m) was drained off. Then 8.5 m$^3$ hot water (at 92° C.) was added, sulfur dioxide was added to the mass within the vessel 1 until a concentration of about 0.5 n was reached, and water vapour was added to the vessel through the injector mixer 17 so that the mass within the vessel reached the required temperature of 80°–85° C. After the mass had reached the required parameters of acidity and temperature, the mixture was mixed for 1 min., then allowed to rest for about 30 min., then was agitated for 1 min., then was allowed to rest for 30 min., was agitated for 1 min. and after 60 min. of rest the extract was drained off through outlet 6. After 70% of the liquid phase had been drained a new amount of water at 90° C. was fed into the vessel 1, additional sulphur dioxide was used for saturation until a value of 0.3 n was reached, and if need be water and steam were fed through the injector-mixer so that the mass reached the temperature of 70°–80° C. The extraction was then conducted in the following manner: 30 seconds of agitation, 30 min. of rest, 30 seconds of agitation, 60 min. of rest, after which the extract was drained through opening 6. After draining 70% of the liquid phase, the residual vegetable mass was discharged from the vessel through opening 4 at the bottom thereof.

EXAMPLE 4

8 m$^3$ of water was poured into the extraction vessel 1, the agitator was started, and 500 kg of apple pressings were added to the vessel. After 1 min. of agitation and 15 min. of rest, the liquid phase (6.5 m) was drained through the outlet 6. Then 3.5 m$^3$ of hot water at 92° C. was added. The mass was saturated by sulphur dioxide to about 0.5 n and then water and steam were fed through the injector-mixer 17 so that the mass reached the required temperature of 80° to 85° C. After the required parameters had been reached, both for acid content and temperature, the mixture was mixed for 20 min. after which it was sent for separation or pressing.

EXAMPLE 5

5,000 kg of fresh apple pressings were placed in the extraction vessel 1, 5 m$^3$ of water was added, and the agitator was started. The agitator was run initially for 1 min. of intensive operation, and then for 10 min. of light agitation. Then the liquid phase (dilute apple juice) was drained and the pressings were sent for additional pressing and separation of the liquid phase, and the washed pressings were dried in the normal manner.

EXAMPLE 6

5,500 kg of fresh pressed carrots were mixed in 4.5 m$^3$ of water in the extraction vessel 1, and the mixture was stirred intensively for 2 min., followed by 10 min. of light agitation. Then the liquid phase (dilute carrot juice) was drained, and the solid phase was subjected to pressing for the separation of extra juice, and the pressings produced were dried in the normal manner.

EXAMPLE 7

This example is similar to Example 5 but with the difference in this example that in this example a double extraction was made initially of dilute apple juice produced from a preceeding second apple pressing extraction, and then extraction with water was conducted.

The method and apparatus of the invention have the following advantages.

A greater accelerated diffusion is achieved in the whole extractionable volume, due to the following-type turbulent continuous mass movement by means of two modes of agitation which differ in intensity, and alternately changing the mode of the propellor mechanism guaranteeing high relative speeds and large speed of motion of the mass. In such mode treatment, and due to the special shape and ribs of the screen 5, 5' there is achieved an accelerated and even extract separation which is convenient for repeated extractions. This results in a shorter production cycle and a greater yield of the extractable matter. This is especially true in pectin extraction, wherein the yields produced by the method and apparatus of the present invention increase from 10 to 60% as compared with the prior art extraction methods.

Although the invention is illustrated and described with a reference to a plurality of preferred embodiments thereof, it is to be expressly understood that it is in no way limited to the disclosure of such plurality of preferred embodiments, but is capable of numerous modifications in the scope of the apended claims.

We claim:

1. Apparatus for the extraction of a mass of fruit, vegetable pressings, or plant raw materials in a closed system, comprising a closed heat-insulated vessel with an internal draining wall, a driving unit having two driving speeds, a vertical shaft within the vessel driven by the driving unit, an impeller mounted on the lower end of the shaft, means for rectifying the material flow, an elongated vertical diffuser within which the impeller is disposed, the vessel having an imperforate side wall, and the internal draining wall of the vessel being in the form of a screen spaced inwardly from the imperforate wall of the vessel, and forming an annular draining chamber therewith, and comprising means for discharging liquid from the space between the imperforate wall and the internal draining wall thereof, the means for rectifying the material flow being disposed above the impeller in the vertical diffuser, and being in the form of a rectifying grid whereby the material driven upwardly by the impeller travels directly upwardly without substantially any spin within the upper part of the vertical diffuser.

2. Apparatus according to claim 1, wherein the screen forming the internal draining wall has arcuate portions spaced radially from the imperforate side wall of the vessel, such arcuate portions being of equal angular extent and being separated by inwardly folded zones of the screen.

3. The apparatus according to claim 1, wherein the vessel has a downwardly converging frusto-conical bottom and the diffuser is mounted generally coaxial of the bottom of the vessel and has a lower, upwardly converging frusto-conical mass entry end disposed close to and above the central, lowermost part of the bottom of the vessel.

4. The apparatus according to claim 3, wherein the cover has a ventilation opening and an opening therein for charging the mass of material into the vessel.

5. Apparatus according to claim 4, comprising a sprinkling tube disposed within the vessel inwardly of the internal draining wall, and wherein the apparatus further comprises an injector-mixer of the Venturi pipe type which serves to inject heating fluid into the mass in the vessel via a delivery pipe connected to said sprinkling tube.

* * * * *